United States Patent
De Benedittis et al.

(10) Patent No.: US 9,549,350 B2
(45) Date of Patent: Jan. 17, 2017

(54) METHODS AND APPARATUS FOR HANDOVER MANAGEMENT

(71) Applicant: Nokia Siemens Networks Oy, Espoo (FI)

(72) Inventors: Rossella De Benedittis, Ulm (DE); Juergen Mayer, Blaustein (DE); Sean Kelley, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 15 days.

(21) Appl. No.: 13/862,833

(22) Filed: Apr. 15, 2013

(65) Prior Publication Data
US 2014/0308959 A1 Oct. 16, 2014

(51) Int. Cl.
*H04W 36/00* (2009.01)
*H04W 36/04* (2009.01)

(52) U.S. Cl.
CPC ......... *H04W 36/0061* (2013.01); *H04W 36/04* (2013.01)

(58) Field of Classification Search
CPC .... H04W 36/30; H04W 36/18; H04W 84/045; H04W 36/04; H04W 36/0055; H04W 36/0083; H04W 88/08; H04W 12/06; H04W 24/10; H04W 28/04; H04W 36/00; H04W 36/0061; H04W 36/0077; H04W 36/0094; H04W 36/026; H04W 36/08
USPC ...................................................... 455/437
See application file for complete search history.

(56) References Cited

U.S. PATENT DOCUMENTS

| | | | | |
|---|---|---|---|---|
| 8,577,360 B2* | 11/2013 | Olsson | ............... | H04W 76/027 370/331 |
| 8,634,868 B2* | 1/2014 | Hedberg | ............... | H04L 5/0058 455/501 |
| 8,914,027 B2* | 12/2014 | Kone | ............... | H04W 36/0055 455/423 |
| 9,066,242 B2* | 6/2015 | Kazmi | ............... | H04W 16/26 |
| 9,414,299 B2* | 8/2016 | Adachi | ............... | H04W 12/06 |

(Continued)

FOREIGN PATENT DOCUMENTS

| | | |
|---|---|---|
| WO | WO-2008-113373 A1 | 9/2008 |
| WO | WO-2012-146276 A1 | 11/2012 |
| WO | WO-2012-154089 A1 | 11/2012 |

OTHER PUBLICATIONS

"Support of the Target HNB Cell Disambiguation at the HNB-GW", Alcatel Lucent, et al., 3GPP TSG-RAN3 Meeting #78, R3-122822, Nov. 2012, 4 pgs.

(Continued)

*Primary Examiner* — Matthew Sams
(74) *Attorney, Agent, or Firm* — Harrington & Smith

(57) ABSTRACT

Systems and techniques for handover management between macro base stations and home base stations. Upon receiving a measurement report from a user device including a physical cell identity and frequency pair associated with a candidate handover home base station, a macro base station transmits a message to a home base station gateway to obtain cell global identifiers of specified home base stations, which may include home base stations associated with a list of physical cell identifiers and frequency pairs including the pair received in the measurement report. Upon receiving the cell global identifiers, the base station identifies a handover target and performs signaling to the user device to direct handover to the target.

12 Claims, 8 Drawing Sheets

(56) References Cited

U.S. PATENT DOCUMENTS

| | | | | |
|---|---|---|---|---|
| 2006/0235852 | A1* | 10/2006 | Gaug | 707/10 |
| 2007/0281696 | A1* | 12/2007 | Vikberg | H04L 12/2854 455/436 |
| 2008/0267131 | A1 | 10/2008 | Kangude | |
| 2009/0034476 | A1 | 2/2009 | Wang | 370/331 |
| 2009/0196168 | A1* | 8/2009 | Aydin et al. | 370/216 |
| 2009/0274302 | A1 | 11/2009 | Wu | 380/272 |
| 2010/0093354 | A1* | 4/2010 | Agashe | H04W 36/04 455/436 |
| 2010/0111037 | A1 | 5/2010 | Tanigawa et al. | 370/331 |
| 2010/0173610 | A1 | 7/2010 | Kiazoe | 455/411 |
| 2010/0240371 | A1* | 9/2010 | Cook | H04W 36/0083 455/436 |
| 2011/0039552 | A1 | 2/2011 | Narasimha et al. | 455/425 |
| 2011/0076960 | A1 | 3/2011 | Yun et al. | 455/67.14 |
| 2011/0128937 | A1 | 6/2011 | Iwamura et al. | 370/331 |
| 2011/0149911 | A1* | 6/2011 | Zhang | 370/331 |
| 2011/0189998 | A1 | 8/2011 | Joo et al. | 455/444 |
| 2011/0206011 | A1* | 8/2011 | Ishida | H04W 36/0083 370/331 |
| 2011/0292790 | A1 | 12/2011 | Iwamura et al. | 370/225 |
| 2011/0294508 | A1 | 12/2011 | Min et al. | 455/436 |
| 2011/0310841 | A1 | 12/2011 | Jung et al. | 370/331 |
| 2012/0003977 | A1 | 1/2012 | Iwamura et al. | 455/436 |
| 2012/0071169 | A1 | 3/2012 | Olofsson et al. | 455/446 |
| 2012/0077509 | A1 | 3/2012 | Huang | 455/450 |
| 2012/0087338 | A1* | 4/2012 | Brandt | H04W 36/0055 370/331 |
| 2012/0135736 | A1 | 5/2012 | Sebire et al. | 455/436 |
| 2012/0220228 | A1* | 8/2012 | Tandai et al. | 455/41.1 |
| 2012/0258719 | A1* | 10/2012 | Fujito | H04W 88/08 455/438 |
| 2012/0315908 | A1 | 12/2012 | Li | 455/436 |
| 2013/0064092 | A1* | 3/2013 | Xi et al. | 370/235 |
| 2013/0143526 | A1* | 6/2013 | Kanugovi et al. | 455/411 |
| 2013/0259003 | A1* | 10/2013 | Kwon | H04W 36/08 370/331 |
| 2014/0211756 | A1* | 7/2014 | Bontu | H04W 36/04 370/331 |

OTHER PUBLICATIONS

"Support or Legacy UEs hand-in", Nokia Siemens Networks, et al., 3GPP TSG-RAN WG3 Meeting #78, R3-122886, Nov. 2012, 5 pgs.

"3$^{rd}$ Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, Dec. 2012, 340 pgs.

"3$^{rd}$ Generation Partnership Project; Technical Specification Group Radio Access Network; Evolved Universal Terrestrial Radio Access (E-UTRAN); S1 Application Protocol (S1AP) (Release 11)", 3GPP TS 36.413 V11.2.1, Feb. 2013, 272 pgs.

"3$^{rd}$ Generation Partnership Project; Technical Specification Group Radio Access Network; Evolved Universal Terrestrial Radio Access (E-UTRAN); X2 application protocol (X2AP) (Release 11)", 3GPP TS 36.423 V11.3.0, Dec. 2012, 118 pgs.

NTT DOCOMO INC.; "Solving PCI confusion for Rel-8 UE"; Tdoc-R2-093968; 3GPP TSG-RAN WG2 #66bis, Los Angeles, CA, USA; Jun. 29-Jul. 3, 2009; whole document (5 pages).

Qualcomm Europe; "Connected mode mobility in the presence of PCI confusion"; R3-090699; 3GPP TSG-RAN WG3 meeting #63-bis, Seoul, Korea; Mar. 23-27, 2009; whole document (4 pages).

3GPP TS 33.401 V12.7.0; "3$^{rd}$ Generation Partnership Project; Technical Specification Group Services and System Aspects; 3GPP System Architecture Evolution (SAE); Security Architecture (Release 12)"; Mar. 2013; whole document (121 pages).

3GPP TS 36.321, V11.2.0; "3$^{rd}$ Generation Partnership Project; Technical Specification Group Radio Access Network; Evolved Universal Terrestrial Radio Access (E-UTRA); Medium Access Control (MAC) protocol specification (Release 11)"; Mar. 2013; whole document (56 pages).

3GPP TS 36.331 V11.3.0; "3$^{rd}$ Generation Partnership Project; Technical Specification Group Radio Access Network; Evolved Universal Terrestrial Radio Access (E-UTRA); Radio Resource Control (RRC); Protocol specification (Release 11)"; Mar. 2013; whole document (344 pages).

3GPP TS 36.413 V11.3.0; "3$^{rd}$ Generation Partnership Project; Technical Specification Group Radio Access Network; Evolved Universal Terrestrial Radio Access Network (E-UTRAN); S1 Application Protocol (S1AP) (Release 11)"; Mar. 2013; whole document (274 pages).

3GPP TS 36.423 V 11.4.0; "3$^{rd}$ Generation Partnership Project; Technical Specification Group Radio Access Network; Evolved Universal Terrestrial Radio Access Network (E-UTRAN); X2 application protocol (X2AP) (Release 11)"; Mar. 2013; whole document (144 pages).

3GPP TR 37.803 V 11.1.0 ; "3$^{rd}$ Generation Partnership Project; Technical Specification Group Radio Access Network; Universal Mobile Telecommunications System (UMTS) and LTE; Mobility enhancements for Home Node B (HNB) and Home enhanced Node B (HeNB) (Release 11)"; Dec. 2012; whole document (118 pages).

* cited by examiner

METHODS AND APPARATUS FOR HANDOVER MANAGEMENT

TECHNICAL FIELD

The present invention relates generally to wireless communication. More particularly, the invention relates to improved systems and techniques for energy efficient management of handover of user devices from one base station to another.

BACKGROUND

As the number of wireless cellular data communication devices continues to increase and as their data capabilities continue to be more and more heavily used, the demands on available infrastructure and frequencies continue to increase. The addition of infrastructure to meet demand is costly, and is becoming more and more difficult as unoccupied space suitable for placement of larger base stations diminishes. In addition, as saturation of available wireless communication frequencies approaches, addition of conventional infrastructure approaches a point of ineffectiveness.

In order to support the growing demand for data communication services, therefore, network operators are turning more and more to managing existing resources, particularly frequency resources, so as to increase the number of users served by the resources. Traditionally, users have been served by deployments of larger base stations, with each base station defining and providing radio coverage to one or more cells which constitute a relatively wide area. In networks configured according to third generation partnership project (3GPP) long term evolution (LTE) standards, such a larger base station may be implemented as a macro eNodeB (eNB) and may define one or more macro cells. One approach to increasing the number of users that may be served is the deployment of smaller, lower power base stations, which in a 3GPP LTE system may be implemented as a home eNB (HeNB) or femtocell, and typically define one cell, although more than one cell is also possible.

Numerous HeNBs (for example, in third generation partnership project (3GPP) long term evolution (LTE) or LTE-advanced (LTE-A) networks) may be deployed by homes and businesses, which direct traffic in their vicinity to an Internet connection. In addition, cellular network operators may themselves deploy HeNBs in the vicinity of a macro eNB, to take on traffic that would otherwise be supported by the macro eNB. Dense deployment of HeNBs can substantially increase the capacity by allowing the reuse of frequencies within a macro cell.

SUMMARY

In one embodiment of the invention, an apparatus comprises at least one processor and memory storing computer program code. The memory storing the computer program code is configured to, with the at least one processor, cause the apparatus to at least receive, from a user device, measurement report information comprising a physical cell identifier and frequency pair of a home base station identified as a handover candidate and cause transmission of a preparation request message to at least one home base station associated with the physical cell identifier and frequency pair. The preparation request message comprises information usable by the at least one home base station to prepare the home base station for a handover of the user device and information usable by at least one additional home base station for a handover or a connection re-establishment. The apparatus is also caused to receive a preparation acknowledgement message comprising information from at least one of the home base stations responding to the preparation request message and cause transmission to the user device of a handover command message using information provided by the preparation acknowledgement message.

In another embodiment of the invention, an apparatus comprises at least one processor and memory storing computer program code. The memory storing the computer program code is configured to, with the at least one processor, cause the apparatus to at least cause direction of a cell identity request to an identified plurality of home base stations connected to a same home base station gateway requesting the cell global identifier of each of the plurality of home base stations and, in response to the cell identity request, receive from the home base station gateway a cell identity response comprising the cell global identifier for each of the home base stations associated with the identified plurality.

In another embodiment of the invention, a method comprises receiving, from a user device, measurement report information comprising a physical cell identifier and frequency pair of a home base station identified as a handover candidate and causing transmission of a preparation request message to at least one home base station associated with the physical cell identifier and frequency pair. The preparation request message comprises information usable by the at least one home base station to prepare the home base station for a handover of the user device and information usable by at least one additional home base station for a handover or a connection re-establishment. The method further comprises receiving a preparation acknowledgement message comprising information from at least one of the home base stations responding to the preparation request message and causing transmission to the user device of a handover command message using information provided by the preparation acknowledgement message.

In another embodiment of the invention, a method comprises causing direction of a cell identity request to an identified plurality of home base stations connected to a same home base station gateway requesting the cell global identifier of each of the plurality of home base stations and, in response to the cell identity request, receiving from the home base station gateway a cell identity response comprising the cell global identifier for each of the home base stations associated with the identified plurality.

In another embodiment of the invention, a computer-readable medium stores a program of instructions. Execution of the program of instructions by a processor configures an apparatus to at least receive, from a user device, measurement report information comprising a physical cell identifier and frequency pair of a home base station identified as a handover candidate and cause transmission of a preparation request message to at least one home base station associated with the physical cell identifier and frequency pair. The preparation request message comprises information usable by the at least one home base station to prepare the home base station for a handover of the user device and information usable by at least one additional home base station for a handover or a connection re-establishment. The apparatus is also configured to receive a preparation acknowledgement message comprising information from at least one of the home base stations responding to the preparation request message and cause transmission to the user device of a handover command message using information provided by the preparation acknowledgement message.

In another embodiment of the invention, a computer-readable medium stores a program of instructions. Execution of the program of instructions by a processor configures an apparatus to at least cause direction of a cell identity request to an identified plurality of home base stations connected to a same home base station gateway requesting the cell global identifier of each of the plurality of home base stations and, in response to the cell identity request, receive from the home base station gateway a cell identity response comprising the cell global identifier for each of the home base stations associated with the identified plurality.

In another embodiment of the invention, a computer readable medium stores a program of instructions. Execution of the program of instructions by a processor configures an apparatus to at least receive a preparation request message comprising information usable by a first home base station to prepare the first home base station for a handover of the user device connection and information usable by at least one additional home base station for a handover or a connection re-establishment. The apparatus is also configured to cause transmission of a preparation request message to each of the additional home base stations comprising information usable by the additional home base station to which the preparation request message is addressed to prepare the additional home base station for a handover or a connection re-establishment from a same user device.

In another embodiment of the invention, a computer readable medium stores a program of instructions. Execution of the program of instructions by a processor configures an apparatus to at least receive handover information comprising a physical cell identifier and frequency pair of a home base station identified as a handover candidate and cause transmission of a preparation request message to at least a first home base station associated with the said physical cell identifier and frequency pair. The preparation request message is usable by each home base station to which the preparation request message is addressed to prepare the home base station for a user device connection handover. The apparatus is also configured to cause transmission of a preparation request message to at least one additional home base station associated with the above said physical cell identifier and frequency pair. The preparation request message comprises information usable by each home base station to which the preparation request message is addressed to prepare the home base station for a connection re-establishment from a same user device. The apparatus is also configured to receive a preparation acknowledgement message comprising information from the home base station selected as handover target and a preparation acknowledgment message comprising information from each of the home base stations selected for connection-reestablishment and cause transmission of a handover command for the selected target home base station to the above said user device using information received in the preparation acknowledgement message.

In another embodiment of the invention, the apparatus sending any of the above said preparation request messages to the home base stations and any of the above said handover preparation acknowledgement messages to the apparatus which receives the handover information is a home base station gateway which controls the home base stations.

DETAILED DESCRIPTION

Embodiments of the present invention recognize that transferring user devices (user equipments or UEs in 3GPP LTE systems) from eNBs to HeNBs may substantially relieve the traffic load of the eNBs. Such transfer need not excessively burden the frequencies used by the HeNBs, even if the HeNBs all use the same frequency, because an HeNB may provide coverage over a relatively short range. In addition, adjacent HeNBs may use different frequencies if needed and HeNBs may also automatically configure themselves. HeNBs generally provide self configurable environments which can be switched on and off frequently. An HeNB is identified by a physical cell identity (PCI), and may change PCIs when it is switched on after having been switched off. An HeNB may also change frequencies depending on measured radio interference. Because of their limited radio coverage, the number of HeNBs that may be deployed within the area also covered by a macro eNB cell can be very high, and the possibility of a large number of HeNBs raises the possibility of duplication of PCIs between HeNBs. Such duplication can easily be managed so as not to cause confusion of HeNBs by a UE, because a UE will likely not be in range of two HeNBs with the same PCI. However, every HeNB will likely be within range of the macro eNB cell, and many, most, or all of the HeNBs will be, at various times, handover candidates for macro eNB cell traffic. Each HeNB within the macro eNB cell will be a neighbor of the macro eNB cell, and duplication by two or more HeNBs of the same PCI and frequency combination within a macro eNB cell is known as PCI confusion. Embodiments of the invention recognize that addressing the possibility of PCI confusion can increase the efficiency of handover between a macro eNB cell and neighboring HeNBs.

Figure 1:
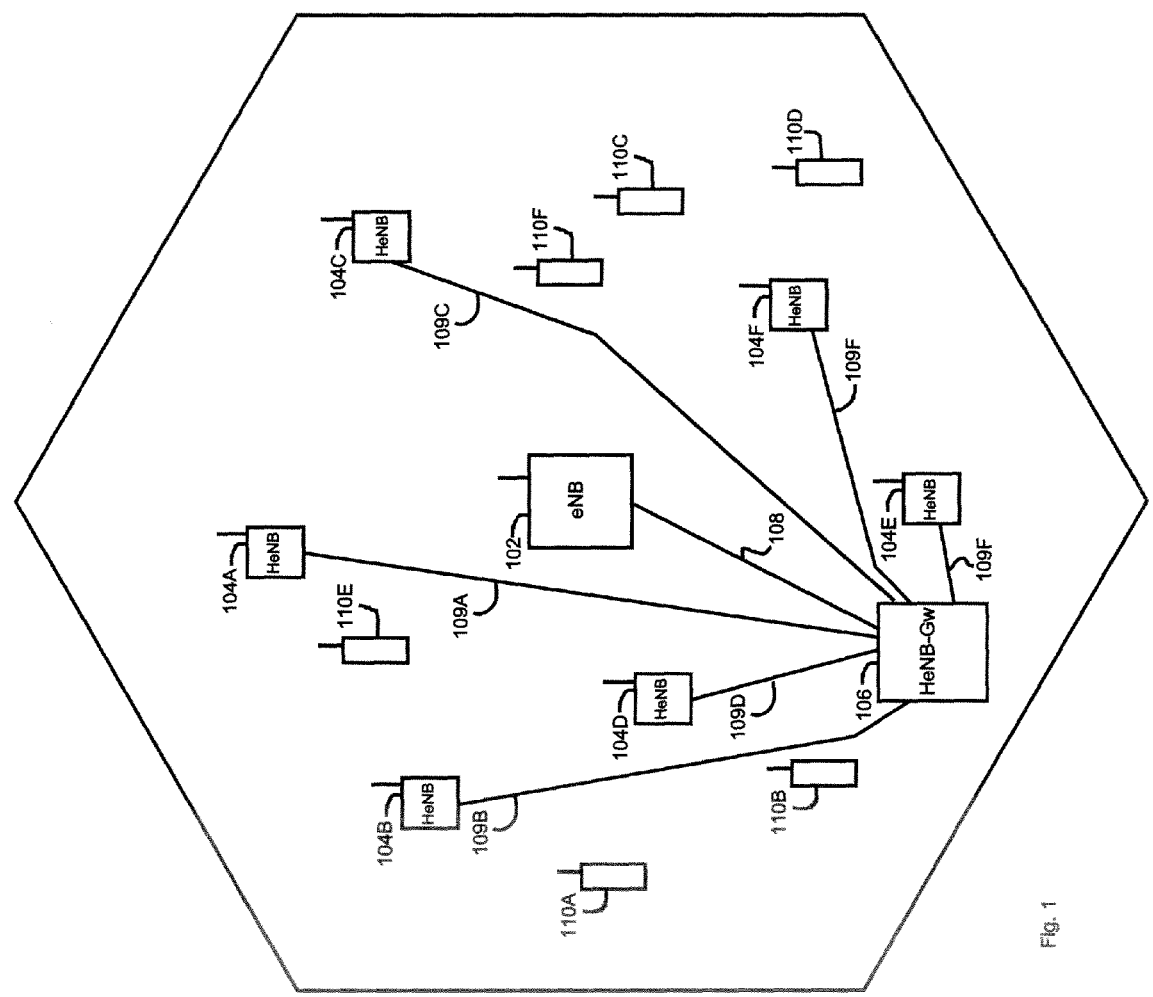
FIG. 1 illustrates a wireless communications network according to an embodiment of the present invention.

HeNBs can communicate with a macro eNB through a gateway. FIG. 1 illustrates a wireless network 100 according to an embodiment of the present invention. The network 100 comprises a macro eNB 102 and HeNBs 104A-104F. A gateway 106 communicates with HeNBs 104A-104F and represents the HeNBs 104A-104F to the macro eNB 102. The gateway 106 may suitably communicate with the macro eNB 102 and the HeNBs 104A-104F through X2 connections 108 and 109A-109F. The network 100 may be a 3GPP LTE or LTE-advanced (LTE-A) system and may support UEs 110A-110F. For simplicity, only the HeNBs 104A-104F and the UEs 110A and 110F are illustrated and discussed here, but it will be recognized that many HeNBs and many UEs may be present in the coverage area of a macro eNB such as the macro eNB 102. The exemplary network 100 is here represented as comprising a macro eNB and a plurality of HeNBs, and supporting UEs. These components are characteristic of third generation partnership project (3GPP) long term evolution (LTE) or LTE-advanced (LTE-A) networks, but it will be recognized that embodiments of the invention may be employed with any appropriate network, such as universal mobile terrestrial service (UMTS) networks.

In mobile radio systems such as the network 100, a decision to hand over a UE from one cell to another is generally triggered by a radio measurement report sent by the UE to its serving base station. In the measurement report, the UE identifies cells that exhibit a signal power or quality above a specified threshold. The UE may identify only cells using a specified carrier frequency, and the UE's measurement report will report the PCI's of base stations meeting criteria for handover, such as meeting the signal power or signal quality threshold and operating on a specified carrier frequency.

Because of the potential large number of HeNBs, and the independent nature of their configuration it is, as previously noted, easy to encounter groups of two or more HeNBs operating on the same frequency and using the same PCI. In such cases, the PCI and carrier frequency does not uniquely identify an HeNB, and the macro eNB does not know which cell global identity (CGI) is associated with the HeNB whose PCI and frequency is reported in a radio measurement report. The CGI of the target cell is a mandatory parameter for performing the handover. Embodiments of the invention therefore provide for improved systems and techniques for disambiguating the PCI received in the measurement report and resolve the corresponding CGI before initiating the handover.

In one embodiment of the invention, all of the HeNBs 104A-104F are connected to the gateway 106, which is a common gateway connected via an X2 link 108 to the macro eNB 102. In other embodiments of the invention, multiple gateways may control groups of HeNBs, with a gateway connected to only a portion of the HeNBs. An HeNB radio access network architecture for providing an X2 connection may take the form of an gateway X2 proxy or an X2 routing proxy, and in the present discussion, references to a gateway, such as the gateway 106, may describe, for example, a HeNB-GW X2 proxy, an X2 routing proxy, any comparable mechanism, or any other suitable mechanism for carrying out operations such as those attributed to the gateway.

The macro eNB 102 has information identifying which CGIs correspond to which PCI/frequency pairs of HeNBs connected to the gateway. Such information may come, for example, from operations and maintenance (OAM) configuration, UE measurements, X2 signaling (such as X2 setup/X2 configuration procedures) or via the new X2 Cell Identity enquiry procedure defined in one embodiment of the present invention. Some of the HeNBs 104A-104F use the same PCI/frequency pair, and the macro eNB 102 has no macro eNB neighbors using PCI/frequency pairs assigned to the HeNBs. When the macro eNB receives a UE measurement report including a PCI and carrier frequency for an HeNB—for example, $PCI_x$ operating on carrier frequency $F_y$, it performs operations according to one or more embodiments of the present invention in order to uniquely identify the HeNB to which handover is to be directed.

A number of exemplary embodiments of the invention are detailed below. In a first embodiment, the gateway maintains transaction state information to help manage the handover. In a second embodiment, the gateway helps manage the handover without a need to maintain transaction state information, and in a third embodiment, the handover is performed without impact to the gateway.

1. In an embodiment of the invention, a source eNB sends a HANDOVER REQUEST message to the target HeNB through the gateway. The source eNB sends the HANDOVER REQUEST message to the gateway, with the message including the Target Cell ID information element (IE) and an Additional Target Cell List IE. The gateway forwards the received message to the target HeNB indicated by the Target Cell ID IE and also sends a HANDOVER REQUEST message to each of the additional target HeNBs indicated by the Additional Target Cell List IE. The target HeNB and the additional target HeNBs each respond with a HANDOVER REQUEST ACKNOWLEDGE message or a HANDOVER PREPARATION FAILURE message.

In this present example of the first embodiment three alternative approaches are presented, following the response of the target HeNB and the additional target HeNBs.

In the first alternative approach, the gateway forwards to the source eNB the response that was received from the target HeNB that was indicated by the Target Cell ID IE in HANDOVER REQUEST message. All other responses, such as those from the additional target HeNBs, terminate at the gateway.

In the second alternative approach, the gateway selects one of the HeNBs and forwards its response to the source eNB. The selected HeNB may be the target HeNB that was indicated by the Target Cell ID IE in HANDOVER REQUEST message, or may be one of the additional target HeNBs that was indicated by the Additional Target Cell List IE in the HANDOVER REQUEST message.

In the third alternative approach, the gateway determines which of a plurality of responses from the target HeNB and the additional target HeNBs to forward to the source eNB and aggregates one or more of the responses into a single message.

Once the handover has been completed, the source eNB optionally sends a HANDOVER CANCEL message to the gateway.

The gateway forwards the received HANDOVER CANCEL message to any of the HeNBs that are addressed by the eNB.

2. In another embodiment of the invention, the gateway is not required to maintain state information. In an example of this embodiment, a source eNB sends a HANDOVER REQUEST message to the target HeNB through the gateway. The source eNB sends the HANDOVER REQUEST message to the HeNB-GW, with the message including the Target Cell ID IE and an Additional Target Cell List IE. The gateway forwards the received HANDOVER REQUEST message to the target HeNB indicated by the Target Cell ID IE. Also, the gateway sends a REESTABLISHMENT PREPARATION REQUEST message to each of the additional target HeNBs indicated by the Additional Target Cell List IE. The gateway forwards the response received from the target HeNB to the source eNB.

The source eNB then optionally sends a HANDOVER CANCEL message to the gateway, addressing one or more of the HeNBs such as the additional target HeNBs that were not chosen for the handover as well as the originally chosen target HeNB if it is not finally chosen for the handover.

The gateway then forwards the received HANDOVER CANCEL message to any of the HeNBs that are addressed by the eNB.

3. In another embodiment of the invention, the source eNB sends a HANDOVER REQUEST message to the target eNB. In the present example, one of two alternative approaches are carried out. In the first alternative approach, the source eNB also sends one or more REESTABLISHMENT PREPARATION REQUEST messages to each additional target eNB. The additional target eNBs do not respond.

In a second alternative approach, the source eNB also sends one or more REESTABLISHMENT PREPARATION REQUEST messages to each additional target eNB. The additional target eNBs respond with either a HANDOVER ACKNOWLEDGE message, a REESTABLISH- PREPARATION ACKNOWLEDGE message, a HANDOVER PREPARATION FAILURE message, or a REESTABLISHMENT PREPARATION FAILURE message.

Additional details of the various embodiments of the invention are presented below.

Figure 2:
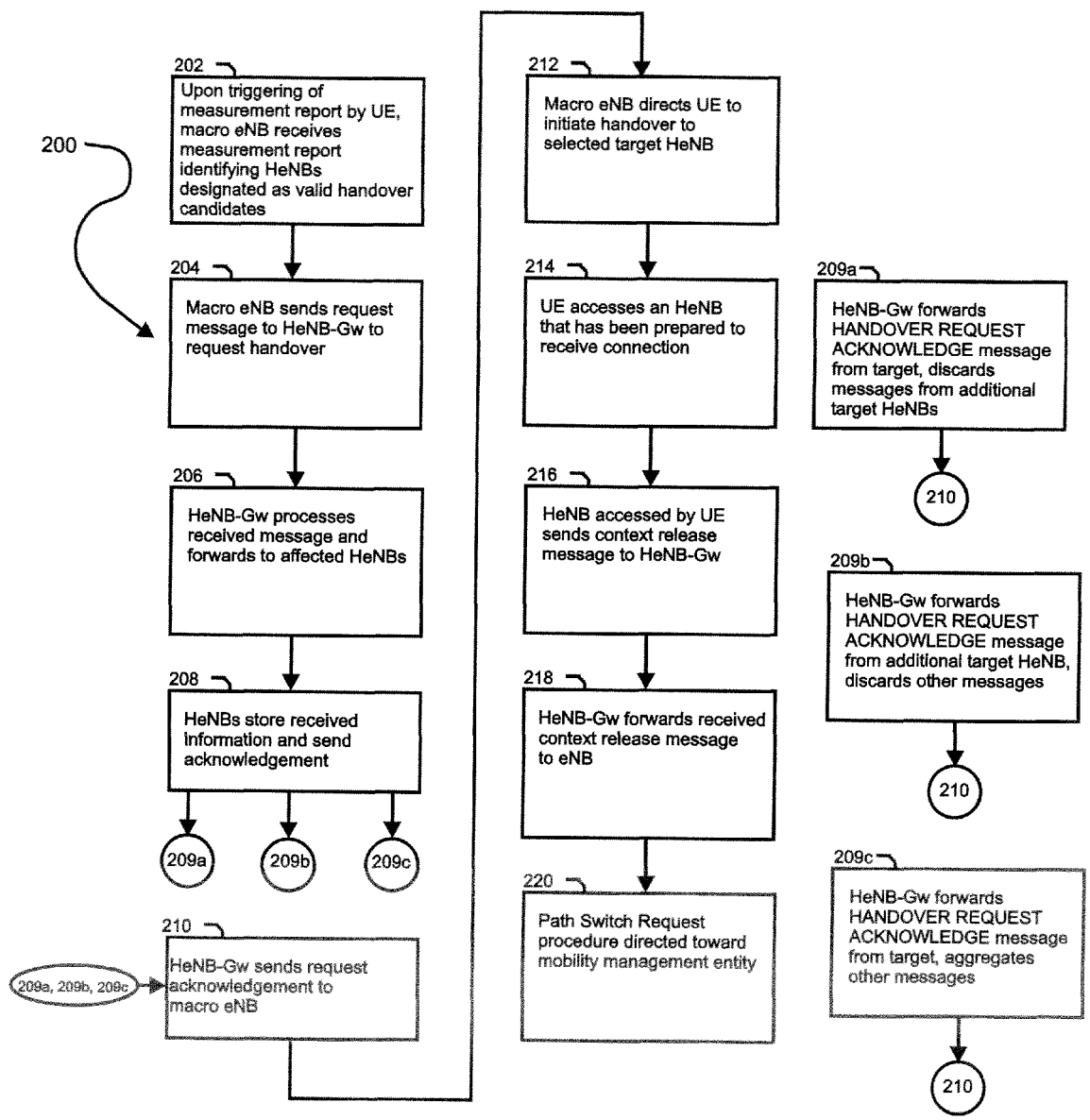
FIGS. 2, 3, 4A, and 4B illustrate processes according to embodiments of the present invention.

FIG. 2 illustrates a process 200 according to an embodiment of the present invention. The process 200 may suitably be described here as carried out by a network such as the network 100 of FIG. 1. Suppose that the UE 110A is triggered to send a measurement report to the macro eNB. At block 202, then, the macro eNB 102 receives a UE measurement report from the UE 110A identifying a target HeNB designated by ($PCI_x$, $F_y$) as a handover candidate. In the present example, this physical signature is used by more than one HeNB, such as by "N" HeNBs.

At block 204, the macro eNB 102 sends a request message to the gateway 106 to prepare a handover. The message may be in the form of an enhanced X2AP:HANDOVER REQUEST message, which may be referred to as X2AP: MULTIPREPARATION HO REQUEST, and may include an Additional Target Cell List information element. Inclusion of the Additional Target Cell List in the HANDOVER REQUEST message allows for a request of preparation of resources at additional target HeNBs which are connected to the same gateway as the target HeNB.

The Additional Target Cell List IE contains the list of additional target HeNBs, each identified by an Additional Target Cell ID field, as well as RRC context information, Additional RRC Context field, for each of the other HeNBs that are prepared for a UE connection re-establishment At block 206, the gateway 106 processes the received X2AP:MULITPREPARATION HO REQUEST message and derives the legacy X2AP:HANDOVER REQUEST message to send to the affected HeNBs, that is, to the HeNB identified as Target Cell ID and to those HeNBs identified as Additional Target Cell ID in the Additional Target Cell List IE. The Target Cell ID IE and the RRC Context IE contain the values corresponding to the addressed HeNB and the Additional Target Cell List IE is suitably omitted from the message sent by the gateway to the respective HeNB, whereas the other information elements contain the values as received from the eNB. At block 208, the HeNBs store the received information and send to the gateway 106 the legacy X2AP:HANDOVER REQUEST ACKNOWLEDGE message.

Depending on a particular approach chosen, the process may proceed to one of block 209a, 209b, and 209c, which provide different options for managing the X2AP:HANDOVER REQUEST ACKNOWLEDGE messages generated by the original target HeNB or the additional target HeNBs.

In a first approach, the process proceeds to block 209a, and the gateway forwards the X2AP:HANDOVER REQUEST ACKNOWLEDGE message from the target HeNB to the source eNB and discards messages from the other HeNBs such as X2AP:HANDOVER REQUEST ACKNOWLEDGE or X2AP:HANDOVER PREPARATION FAILURE messages.

In a second approach, the process proceeds to block 209b, and the gateway forwards the X2AP:HANDOVER REQUEST ACKNOWLEDGE message received from any HeNB to the source eNB, and discards all other X2AP: HANDOVER REQUEST ACKNOWLEDGE messages or X2AP:HANDOVER PREPARATION FAILURE messages from the other HeNBs. With this approach, the X2AP: HANDOVER REQUEST ACKNOWLEDGE message that is to be forwarded to the source eNB is enhanced to include in a Target Cell ID IE the identity of the HeNB which produced such response. If the gateway does not receive an X2AP:HANDOVER REQUEST ACKNOWLEDGE from at least one HeNB, it sends the legacy X2AP:HANDOVER PREPARATION FAILURE message to the source eNB.

In a third approach, the process proceeds to block 209c, and the gateway forwards to the source eNB an enhanced X2AP:HANDOVER REQUEST ACKNOWLEDGE message, which may be referred to as X2AP:MULTIPREPARATION HO REQUEST ACKNOWLEDGE, which is composed aggregating all the replies received from the HeNBs. All the X2AP:HANDOVER REQUEST ACKNOWLEDGE messages or X2AP:HANDOVER PREPARATION FAILURE messages received from (additional) target HeNB(s) are aggregated in the HeB-Gw together with the identity of the answering HeNBs and sent in one single X2AP:MULTIPREPARATION HO REQUEST ACKNOWLEDGE message to the source eNB. If the gateway does not receive a single X2AP:HANDOVER REQUEST ACKNOWLEDGE from at least one (additional) target HeNB, it sends the X2AP:HANDOVER PREPARATION FAILURE message to the source eNB.

At block 212, the macro eNB 102 directs the UE 110A to initiate a handover to the selected target HeNB.

At block 214, the UE 110A accesses one of the prepared HeNBs, such as the HeNB 104A. Such access may be accomplished, for example, with a legacy RRC:ConnectionREconfigurationComplete message or a legacy RRC:ConnectionReestablishmentRequest message.

At block 216, the HeNB 104A sends to the gateway 106 a legacy X2AP: CONTEXT RELEASE message.

At block 218, the gateway 106 forwards to the eNB the received X2AP:CONTEXT RELEASE message, which will successfully conclude the UE handover at the macro eNB 102.

Finally, at block 220, the HeNB 104A initiates an S1AP: Path Switch Request procedure toward the mobility management entity 101.

Figure 3:
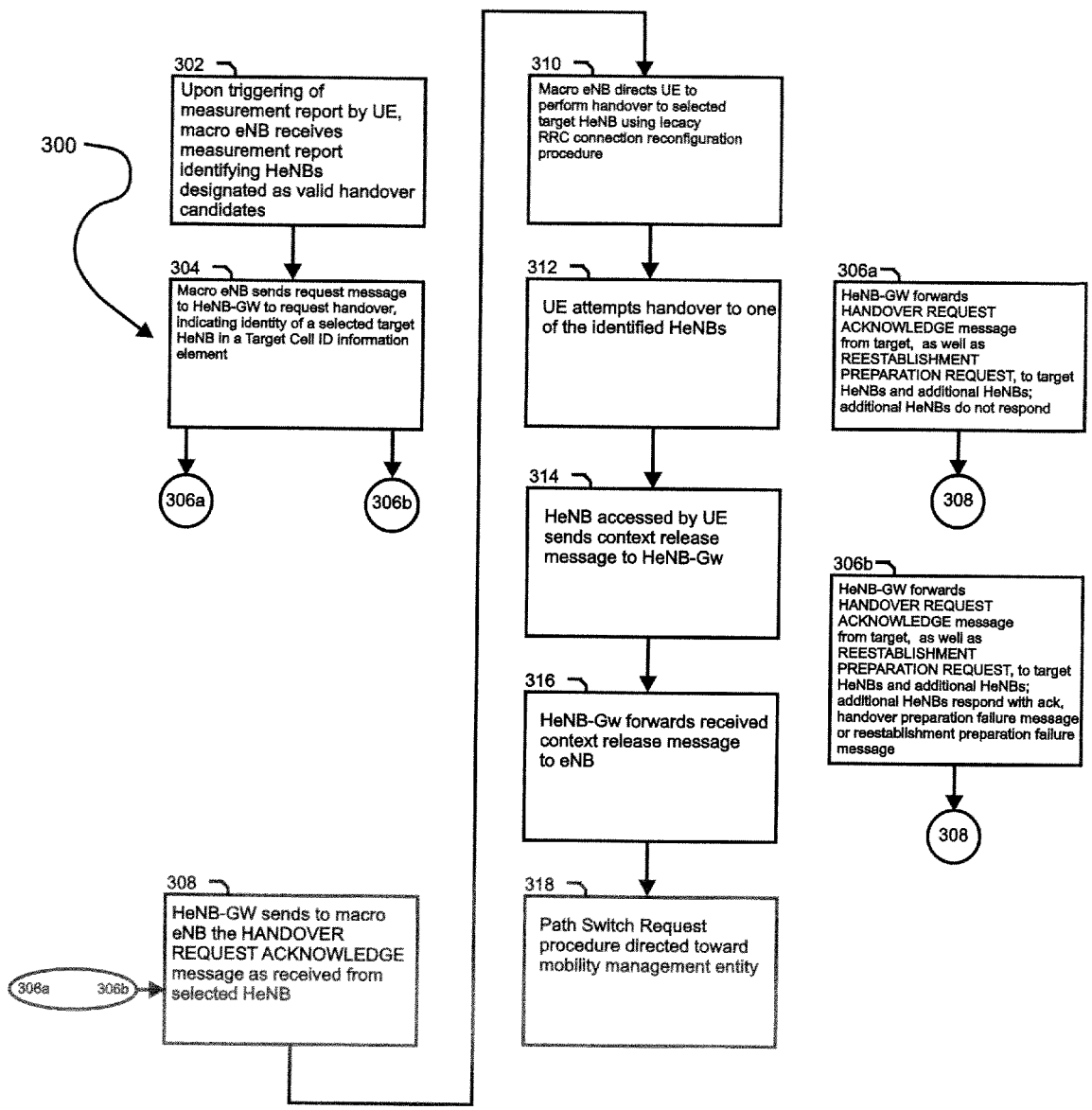

FIG. 3 illustrates a process 300 according to an alternative embodiment of the invention. The process 300 uses variations in some of the mechanisms, message details, and information elements used, as compared to those of the process 200 of FIG. 2, but involves similar initial conditions. At block 302, the macro eNB 102 receives a UE measurement report from the UE 110A identifying HeNBs designated by ($PCI_x$, $F_y$) as valid handover candidates. In the present example, this physical signature is used by more than one HeNB, such as by "N" HeNBs. At block 304, the macro eNB 102 sends to the gateway a X2AP: MULTIPREPARATION HO REQUEST message in a way similar to that described above in connection with block 204 of FIG. 2.

At block 306, the gateway 106 processes the received X2AP:MULTIPREPARATION HO REQUEST message and derives the legacy X2AP:HANDOVER REQUEST messages to send to the HeNBs: the one HeNB identified in the Target Cell ID IE and other HeNBs with the same ($PCI_x$; $F_y$) pair.

Depending on particular design choices, one of two alternative approaches may be followed. In a first approach, at block 306a, the gateway processes the received X2AP: MULTIPREPARATION HO REQUEST message and derives the legacy X2AP:HANDOVER REQUEST message to send to the target HeNB: that is, to the HeNB indicated in the Target Cell ID IE of the X2 message from the source eNB, in a way similar to that described above in connection with Block 206 of FIG. 2. The gateway also derives X2 messages which may be referred here as X2AP:REESTABLISHMENT PREPARATION REQUEST messages to be sent to each additional target HeNB as indicated in the Additional Target Cell ID field of the Additional Target Cell List IE of the X2 message from the source eNB. Each X2AP:REESTABLISHMENT PREPARATION REQUEST message may have the same content as the X2AP:HANDOVER REQUEST message but with the Target Cell ID and RRC Context IEs taken from the Additional Target Cell List IE of the X2AP:MULTIPREPARATION HO REQUEST message according to values specific to the addressed HeNB. The additional target HeNBs do not respond.

In a second alternative approach, at block 306b, the gateway similarly processes the received X2AP:MULTIPREPARATION HO REQUEST message and derives the legacy X2AP:HANDOVER REQUEST message to send to the target HeNB. The gateway derives the X2AP:REESTABLISHMENT PREPARATION REQUEST messages to be sent to the additional target HeNBs indicated in the Additional Target Cell ID field of the Additional Target Cell List IE. The additional target HeNBs respond with either a HANDOVER ACKNOWLEDGE message, a REESTABLISHMENT PREPARATION ACKNOWLEDGE message, a HANDOVER PREPARATION FAILURE message, or a REESTABLISHMENT PREPARATION FAILURE message.

At block 308, the gateway 106 sends to the eNB 102 the X2AP: HANDOVER REQUEST ACKNOWLEDGE message as received from the target HeNB selected in block 304 or alternatively the X2AP: MULTIPREPARATION HO REQUEST ACKNOWLEDGE message including the replies from all the addressed HeNBs if the approach at block 306b has been followed.

At block 310, the eNB 102 triggers the UE 110A to perform a handover to the selected target HeNB using a legacy RRC connection reconfiguration procedure. In one or more embodiments of the invention, such triggering may be accomplished by sending to the UE 110A an RRC: ConnectionReconfiguration message, which may include a mobilityControlInfo IE.

At block 312, the UE 110A attempts a handover to one of the identified HeNBs. That is, the UE 110A attempts a handover to an HeNB identified by ($PCI_x$, $F_y$). This will be either the HeNB chosen by the eNB 102 for the handover, or another HeNB sharing the ($PCI_x$, $F_y$) pair. The HeNBs sharing the ($PCI_x$, $F_y$) pair may be those previously prepared for an RRC Connection Re-establishment procedure, performed at block 304 as described above.

At block 314, the HeNB 104A sends to the gateway 106 a legacy X2AP: CONTEXT RELEASE message.

At block 316, the gateway 106 forwards to the eNB the received X2AP:CONTEXT RELEASE message, which will successfully conclude the UE handover at the macro eNB 102.

Finally, at block 318, the HeNB 104A initiates an S1AP: Path Switch Request procedure toward the mobility management entity 101.

Figure 4A:
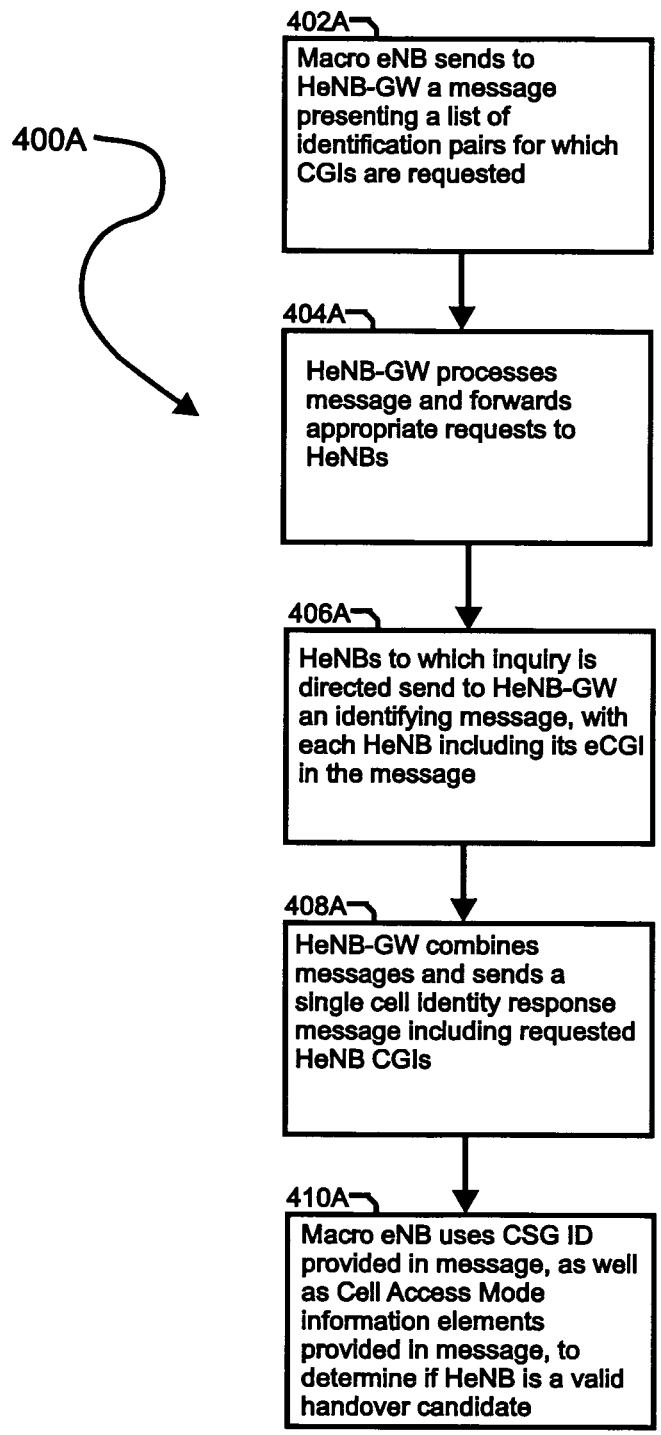

According to another embodiment of this invention the macro eNB, after receiving a measurement report from the UE 110A identifying HeNBs designated by ($PCI_x$, $F_y$) as valid handover candidates, sends to the selected target HeNB the X2AP:HANDOVER REQUEST message and to the other HeNBs sharing the same ($PCI_x$, $F_y$) which may answer to the macro eNB according to either of the previously alternative described at block 306a and 306b. FIG. 4A illustrates an alternative process 400A according to an alternative embodiment of the invention, showing alternative mechanisms for signaling conducted to identify HeNB identities. The following conditions prevail. The eNB 102 is connected over an X2 connection to the gateway. The macro eNB 102 has information identifying which PCI/frequency pairs of HeNBs are connected to the gateway. Such information may come, for example, from organization and management (O&M) configuration, UE measurements, X2 signaling (such as X2 setup/X2 configuration procedures). The macro eNB 102 does not, however, have information associating a PCI/frequency pair with its corresponding CGI. Additionally, no macro eNB that is a neighbor to the eNB 102 uses a (PCI, F) pair assigned to the HeNBs that are neighbors of the macro eNB 102.

Supposed that the eNB 102 receives a measurement report from a UE, such as the UE 110A, and that the measurement report includes a ($PCI_x$, $F_y$) pair associated with an HeNB. The eNB needs to identify the relevant HeNB CGIs before executing the handover. It is possible that the eNB has information, for example, through a previous UE measurement, identifying which CGI corresponds to the ($PCI_x$; $F_y$) pair, but does not have information indicating that this CGI is the only CGI assigned to the pair or if the association is still valid. The process 400 addresses mechanisms allowing for a macro eNB such as the macro eNB 102 to request from the gateway the CGIs corresponding to a given (PCIx; Fy) pair.

At block 402A, a macro eNB such as the eNB 102 initiates with the gateway 106 a new X2 procedure, which may be referred as Cell Identity Enquiry, by sending the X2AP: CELL IDENTITY REQUEST message which presents a list of (PCI; F) pairs and for which CGIs are requested. A list may, for example, include the ($PCI_x$; $F_y$) pair to be disambiguated. If the (PCI; F) list is empty, the message represents a request for the CGIs of all HeNBs connected to the gateway. The message may also include an indication for the modality that is to be used for a response. For example, the message may be configured to indicate that a single response is to be made. As an alternative, the message may be configured to indicate that a spontaneous response is to be made whenever information changes with respect to the last report.

At block 404A, the gateway processes the message and forwards appropriate requests to the subject HeNBs. These may be, for example, all HeNBs identified in a (PCI; F) pair list or, in the absence of such a list, all HeNBs connected to the gateway.

At block 406A, the HeNBs to which the inquiry is directed send to the gateway an X2 message which may be, for example, an X2AP: CELL IDENTITY RESPONSE message, with each HeNB including its evolved universal terrestrial radio access network (E-UTRAN) CGI (eCGI) in the message.

Figure 4B:
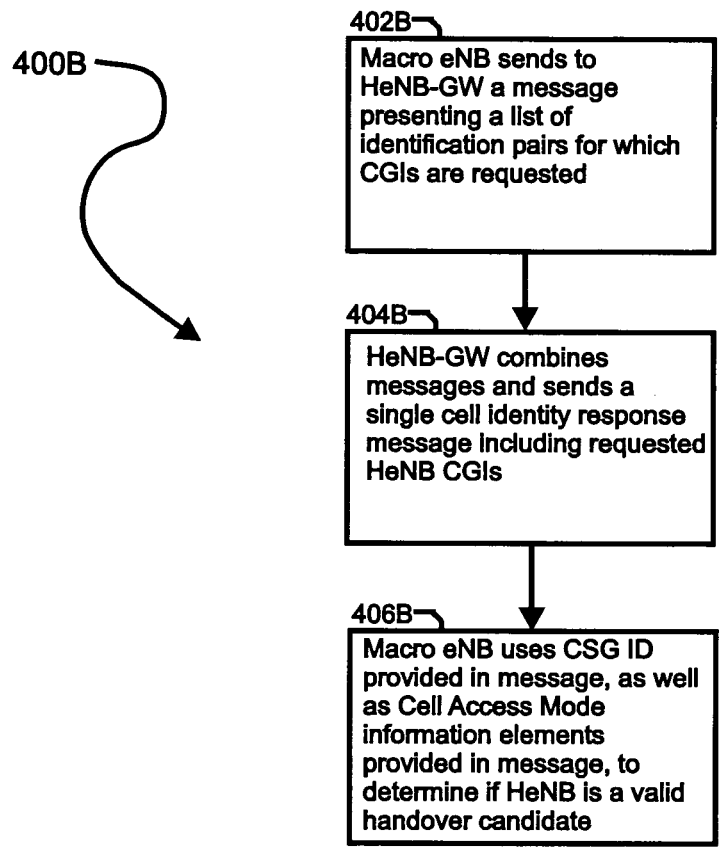

At block 408A, the gateway combines the messages received from the HeNBs and sends to the macro eNB 102 a single X2AP: CELL IDENTITY RESPONSE message, including the requested HeNB CGIs. If more than one HeNB uses the same (PCI; F) pair, more than one CGI will be reported for the pair. At block 410A, the macro eNB 102 uses a CSG ID provided in the message, as well as Cell Access Mode IEs provided in the message, to determine if the HeNB is a valid handover candidate for a UE FIG. 4B illustrates an alternative process to 400A: namely the process 400B, in which the gateway knows the identity of each controlled HeNB and can therefore formulate the requested X2AP:CELL IDENTITY RESPONSE message to send to the source eNB without involvement of the HeNBs.

At block 402B, a macro eNB such as the eNB 102 sends to the gateway 106 a new X2 message, which may be referred as X2AP: CELL IDENTITY REQUEST, which presents a list of (PCI; F) pairs and for which CGIs are requested. A list may, for example, include the ($PCI_x$; $F_y$) pair to be disambiguated. If the (PCI; F) list is empty, the message represents a request for the CGIs of all HeNBs connected to the gateway. The message may also include an indication for the modality that is to be used for a response. For example, the message may be configured to indicate that a single response is to be made. As an alternative, the message may be configured to indicate that a spontaneous response is to be made whenever information changes with respect to the last report.

Figure 5:
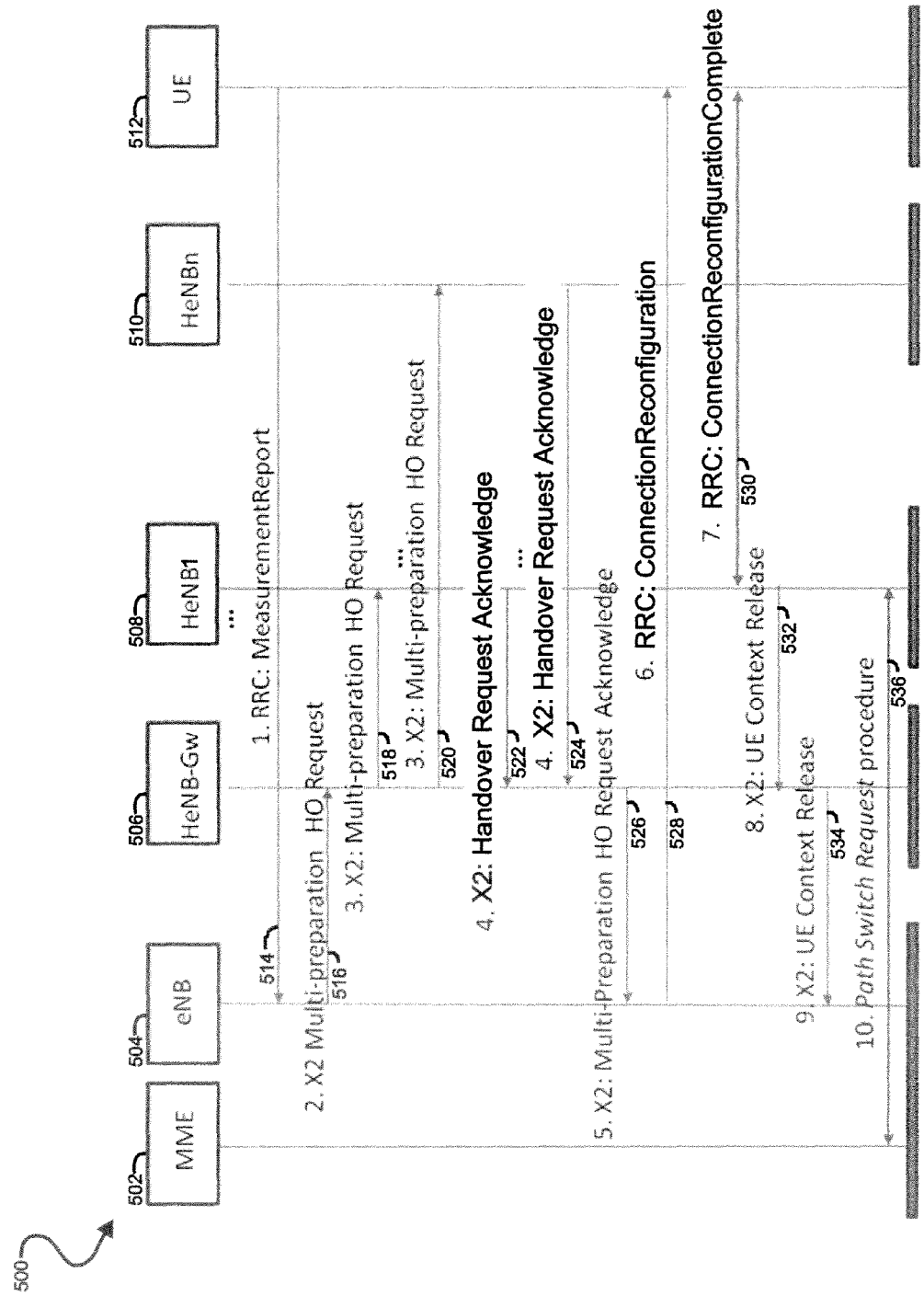
FIGS. 5 and 6 illustrate message flows that may be carried out according to embodiments of the present invention.

At block 404B, the gateway sends to the macro eNB 102 a single X2AP: CELL IDENTITY RESPONSE message, including the requested HeNB CGIs. If more than one HeNB uses the same (PCI; F) pair, more than one CGI will be reported for the pair. At block 410B, the macro eNB 102 uses CSG ID as well as Cell Access Mode IEs provided in the message, to determine if the HeNB is a valid handover candidate for a UE FIG. 5 illustrates an exemplary message flow according to one or more embodiments of the present invention, suitably involving a mobility management entity 502, an eNB 504, a gateway 506, a plurality of HeNBs, comprising a first HeNB 508, suitably designated as HeNB1, through an nth HeNB 510, suitably designated as HeNBn, and a UE 512. The message flow illustrated at FIG. 5 may, for example, be used in carrying out the process 300 of FIG. 3 or the process 400 of FIG. 4. The UE 512 sends an RRC: MeasurementReport message 514 to the eNB 504. The eNB 504 then sends an X2: Multi-Preparation HO Request message 516 to the HeNB-Gw 506, which prepares and sends an X2: Handover request message to designated HeNBs, with the requests exemplified here as requests 518 and 520. The HeNBs return X2: Handover Request Acknowledge messages to the HeNB-Gw, with the Request Acknowledge messages exemplified as messages 522 and 524. The HeNB-Gw sends an X2: Multi-Preparation HO Request Acknowledge message 526 to the eNB 504, which then sends an RRC: ConnectionReconfiguration message 528 to the UE 512. The UE 512 sends an RRC Connection ReconfigurationComplete message 530 to the HeNB 508, which sends an X2: UE Context Release 532 to the gateway 506, which then sends an X2: UE Context Release Message 534 to the eNB 504. The MME 502 and the HeNB 508 then perform a Path Switch Request procedure 536.

In one or more embodiments of the invention, an eNB serving a cell, suitably designated as CellA, sends to the gateway an X2 message, defined as X2AP: CELL IDENTITY REQUEST, with the message requesting the CGIs of listed (PCI; F) pairs. The list may, for example, include a ($PCI_x$; $F_y$) pair to be disambiguated. If the (PCI; F) list is empty, the CGIs of all HeNBs connected to the gateway are requested. With this message, the eNB serving CellA can indicate to the peer node the modality according which it should respond. Examples of response modalities include making one single response, or making spontaneous responses every time the information changes with reference to the last report.

Figure 6:
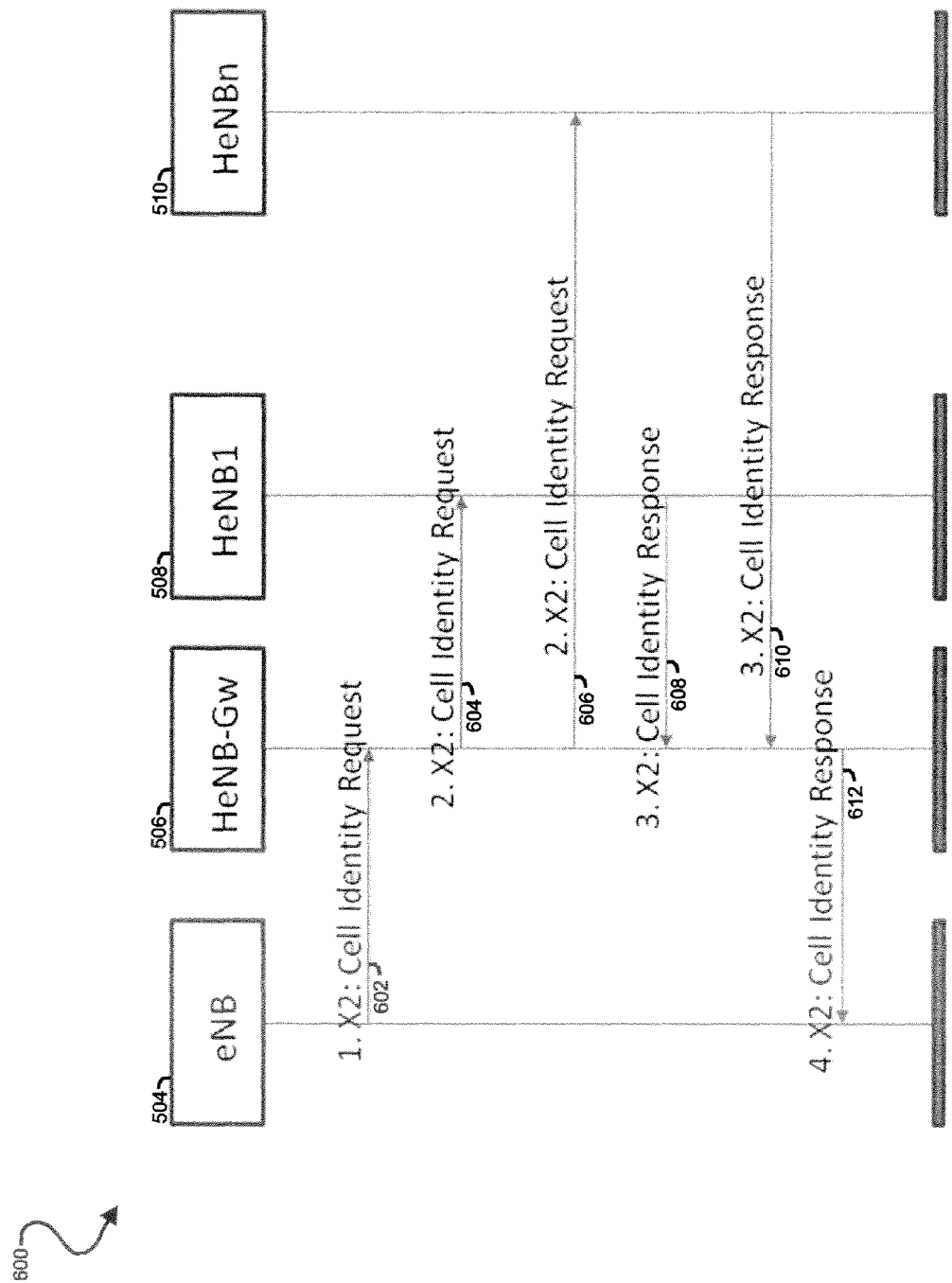

FIG. 6 illustrates a message flow 600 between, for example, the eNB 504, gateway 506, and HeNBs 508-510, that is, HeNB1-HeNBn. The eNB sends an X2: Cell Identity Request message 602 to the gateway 506, and the gateway 506 sends X2: Cell Identity Request messages, exemplified by messages 604 and 606, to relevant ones of the HeNBs 508-510. Relevant ones of the HeNBs 508-510 send X2: Cell Identity Request Response messages, exemplified by messages 608 and 610, to the gateway 506, which then sends an X2: Cell Identity Request Response message 612 to the eNB 504.

Message formats for X2 according to one or more embodiments of the prevent invention are set forth below.

The table below presents a format for an X2: Multiple HO Preparation Request message, with underlined text representing data fields that are additional, as compared to prior art message configurations:
This message is sent by the source eNB to the target eNB to request the preparation of resources for a handover.
Direction: source eNB→target (H)eNB(-Gw).

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER (0 ... $2^{32}$ − 1) | MME UE S1AP ID allocated at the MME | — | — |
| >UE Security Capabilities | M | | 9.2.29 | | — | — |
| >AS Security Information | M | | 9.2.30 | | — | — |
| >UE Aggregate Maximum Bit Rate | M | | 9.2.12 | | — | — |
| >Subscriber Profile ID for RAT/Frequency priority | O | | 9.2.25 | | — | — |
| >E-RABs To Be Setup List | | 1 | | | — | — |
| >>E-RABs To Be Setup Item | | 1 ... <maxnoofBearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>DL Forwarding | O | | 9.2.5 | | — | — |
| >>>UL GTP Tunnel | M | | GTP Tunnel | SGW endpoint of | — | — |

| | | | | | | |
|---|---|---|---|---|---|---|
| Endpoint | | | Endpoint 9.2.1 | the S1 transport bearer. For delivery of UL PDUs. | | |
| >RRC Context | M | | OCTET STRING | Includes the RRC Handover Preparation Information message as defined in subclause 10.2.2 of TS 36.331 [9] | — | — |
| >Handover Restriction List | O | | 9.2.3 | | — | — |
| >Location Reporting Information | O | | 9.2.21 | Includes the necessary parameters for location reporting | — | — |
| >Management Based MDT Allowed | O | | 9.2.59 | | YES | ignore |
| >Management Based MDT PLMN List | O | | MDT PLMN List 9.2.64 | | YES | ignore |
| UE History Information | M | | 9.2.38 | Same definition as in TS 36.413 [4] | YES | ignore |
| Trace Activation | O | | 9.2.2 | | YES | ignore |
| SRVCC Operation Possible | O | | 9.2.33 | | YES | ignore |
| CSG Membership Status | O | | 9.2.52 | | YES | reject |
| Mobility Information | O | | BIT STRING (SIZE (32)) | Information related to the handover; the source eNB provides it in order to enable later analysis of the conditions that led to a wrong HO. | YES | ignore |
| Additional Target Cell List | | 0 . . . <maxnoofAdditionalTargetCells> | | | EACH | ignore |
| >Additional Target Cell ID | M | | ECGI 9.2.14 | | — | — |
| >Additional RRC Context | M | | OCTET STRING | Includes the RRC Handover Preparation Information message as defined in subclause 10.2.2 of TS 36.331 [9] | — | — |

| Range bound | Explanation |
|---|---|
| maxnoofBearers | Maximum no. Of E-RABs. Value is 256 |
| maxnoofMDTPLMNs | PLMNs in the Management Based MDT PLMN list. Value is 16. |
| maxnoofAdditionalTargetCells | Maximum number of additional target cells. Value is TBD. |

The table below presents a format for an X2: Multiple HO Preparation Request Acknowledge message, with underlined text representing data fields that are additional, as compared to prior art message configurations:

This message is sent by the target eNB to inform the source eNB about the prepared resources at the target.

Direction: target gateway→source eNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | ignore |
| New eNB UE X2AP ID | M | | eNB UE X2AP ID 9.2.24 | Allocated at the target eNB | YES | ignore |
| E-RABs Admitted List | | 1 | | | YES | ignore |
| > E-RABs Admitted Item | | 1 . . . <maxnoofBearers> | | | EACH | ignore |
| >>E-RAB ID | M | | 9.2.23 | | — | — |
| >>UL GTP Tunnel Endpoint | O | | GTP Tunnel Endpoint 9.2.1 | Identifies the X2 transport bearer used for forwarding of UL PDUs | — | — |

| | | | | | | |
|---|---|---|---|---|---|---|
| >>DL GTP Tunnel Endpoint | O | | GTP Tunnel Endpoint 9.2.1 | Identifies the X2 transport bearer. Used for forwarding of DL PDUs | — | — |
| E-RABs Not Admitted List | O | | E-RAB List 9.2.28 | A value for E-RAB ID shall only be present once in E-RABs Admitted List IE and in E-RABs Not Admitted List IE. | YES | ignore |
| Target eNB To Source eNB Transparent Container | M | | OCTET STRING | Includes the RRC E-UTRA Handover Command message as defined in subclause 10.2.2 in TS 36.331 [9] | YES | ignore |
| Criticality Diagnostics | O | | 9.2.7 | | YES | ignore |
| Target Cell ID | O | | ECGI 9.2.14 | | YES | ignore |
| Other Target Cell List | | 0 . . . <maxnoofOtherTargetCells> | | | EACH | ignore |
| >Other Target Cell ID | M | | ECGI 9.2.14 | | — | — |
| >CHOICE response type | M | | | | | |
| >>Acknowledge | | | | | | |
| >>>New eNB UE X2AP ID | M | | eNB UE X2AP ID 9.2.24 | Allocated at the target eNB | — | — |
| >>>E-RABs Admitted List | | 1 | | | — | — |
| >>>>E-RABs Admitted Item | | 1 . . . <maxnoofBearers> | | | | |
| >>>>>E-RAB ID | M | | 9.2.23 | | — | — |
| >>>>>UL GTP Tunnel Endpoint | O | | GTP Tunnel Endpoint 9.2.1 | Identifies the X2 transport bearer used for forwarding of UL PDUs | — | — |
| >>>>>DL GTP Tunnel Endpoint | O | | GTP Tunnel Endpoint 9.2.1 | Identifies the X2 transport bearer. Used for forwarding of DL PDUs | — | — |
| >>>E-RABs Not Admitted List | O | | E-RAB List 9.2.28 | A value for E-RAB ID shall only be present once in E-RABs Admitted List IE and in E-RABs Not Admitted List IE. | — | — |
| >>>Target eNB To Source eNB Transparent Container | M | | OCTET STRING | Includes the RRC E-UTRA Handover Command message as defined in subclause 10.2.2 in TS 36.331 [9] | — | — |
| >>Failure | | | | | | |
| >>>Cause | M | | 9.2.6 | | | |

-continued

| Range bound | Explanation |
|---|---|
| maxnoofBearers | Maximum no. Of E-RABs. Value is 256 |
| maxnoofOtherTargetCells | Maximum number of other target cells. Value is TBD. |

The table below presents a format for an X2: Cell Identity Request message:
Direction: eNB1→(H)eNB2(-GW).

| IE/Group Name | Presence | Comments |
|---|---|---|
| Message Type | M | |
| Report characteristics | O | This field indicates the modality to report the requested cell identities, e.g.: If this IE is missing, only one reply is expected; If it is present, a report is expected every time the information changes with reference to the last reported |
| Requested Cell List | | |
| > Requested Cell Item | 0 ... <maxNCells | An empty list implies that the cell identity of all HeNBs are requested |
| >> PCI | M | See [4] for the coding |
| >>EARFCN | M | See [4] for the coding |

The table below presents a format for an X2: Cell Identity Response message:
Direction: (H)eNB2(-GW)→eNB1

| IE/Group Name | Presence | Comments |
|---|---|---|
| Message Type | M | |
| Requested Cell Identities List | | |
| > Requested Cell Identity item | 0 ... <maxNCells | |
| >>PCI | M | |
| >> EARFCN | M | |
| >>Requested CGI item | 1 ... <maxNcells | |
| >>> CGI | M | Coding defined in 3GPP TS 36.423 |
| >>> CSG ID | O | Coding defined in 3GPP TS 36.423 or, If missing, the cell has open access mode |
| >>> Cell Access Mode | Optional, conditional to CSG | Coding defined in 3GPP TS 36.413 |
| Criticality Diagnostics | O | |

Figure 7:
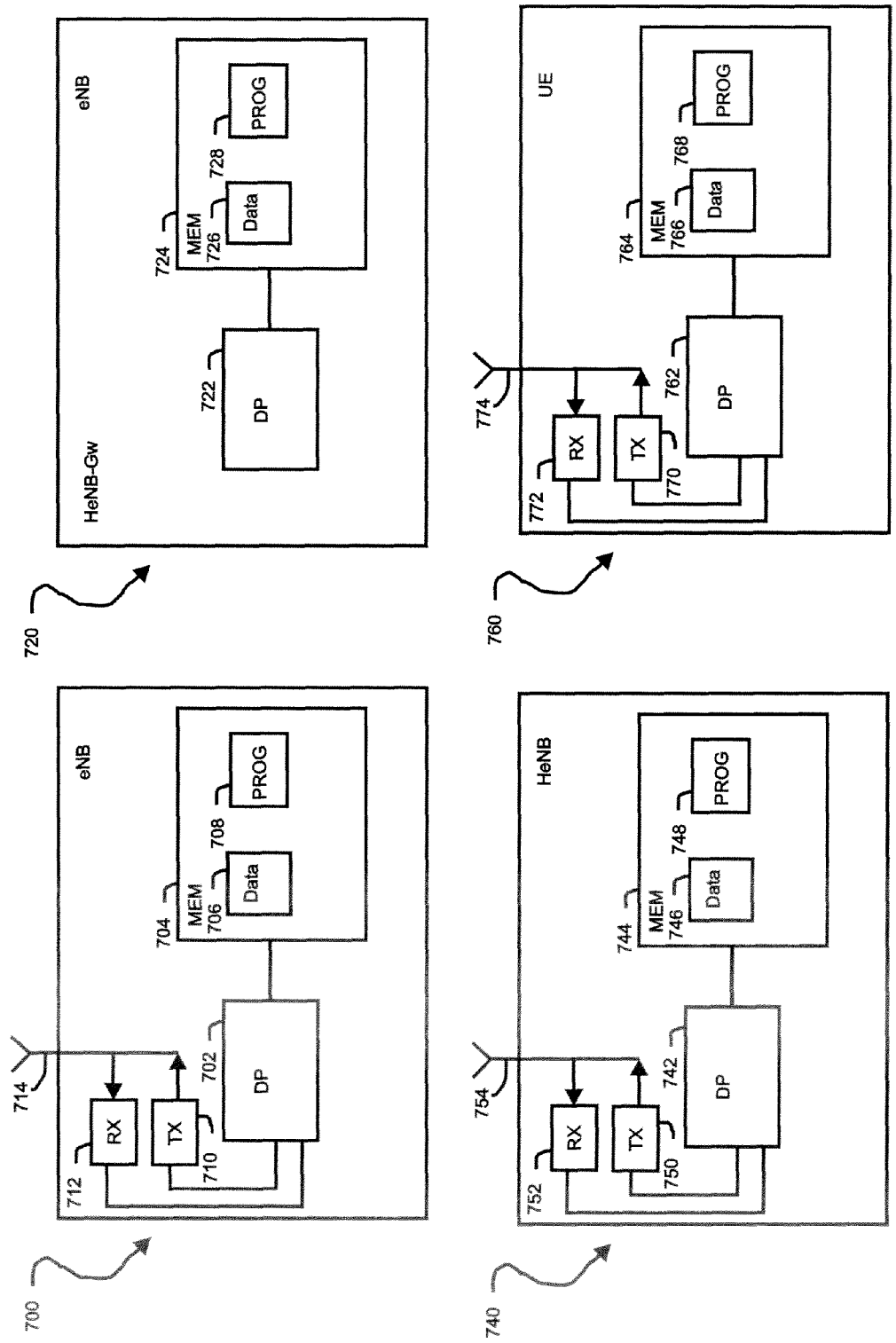
FIG. 7 illustrates elements for communicating and processing data according to an embodiment of the present invention.

Reference is now made to FIG. 7 for illustrating a simplified block diagram of a base station, such as an eNB 700, a gateway 720, an HeNB 740 and a user device, such as a UE 760, suitable for use in practicing the exemplary embodiments of this invention. In FIG. 7 an apparatus, such as the eNB 700 or the HeNB 740, is adapted for communication with other apparatuses having wireless communication capability, such as the UE 760.

The eNB 700 includes processing means such as at least one data processor (DP) 702, storing means such as at least one computer-readable memory (MEM) 704 storing data 706 and at least one computer program (PROG) 708 or other set of executable instructions, communicating means such as a transmitter TX 710 and a receiver RX 712 for bidirectional wireless communications with the UE 760 via an antenna 714.

The gateway 720 includes processing means such as at least one data processor (DP) 722, storing means such as at least one computer-readable memory (MEM) 724 storing data 726 and at least one computer program (PROG) 728 or other set of executable instructions The HeNB 740 includes processing means such as at least one data processor (DP) 742, storing means such as at least one computer-readable memory (MEM) 744 storing data 746 and at least one computer program (PROG) 748 or other set of executable instructions, communicating means such as a transmitter TX 750 and a receiver RX 752 for bidirectional wireless communications with the UE 760 via an antenna array 754.

The UE 760 includes processing means such as at least one data processor (DP) 762, storing means such as at least one computer-readable memory (MEM) 764 storing data 766 and at least one computer program (PROG) 768 or other set of executable instructions, communicating means such as a transmitter TX 770 and a receiver RX 772 for bidirectional wireless communications with the eNB 700 or the HeNB 740 via one or more antennas 774.

At least one of the PROGs 708 in the eNB 700 is assumed to include a set of program instructions that, when executed by the associated DP 702, enable the device to operate in accordance with the exemplary embodiments of this invention, as detailed above. In these regards the exemplary embodiments of this invention may be implemented at least in part by computer software stored on the MEM 704, which is executable by the DP 702 of the eNB 700, or by hardware, or by a combination of tangibly stored software and hardware (and tangibly stored firmware).

Similarly, at least one of the PROGs 708 in the gateway 720 is assumed to include a set of program instructions that, when executed by the associated DP 722, enable the device to operate in accordance with the exemplary embodiments of this invention, as detailed above. In these regards the exemplary embodiments of this invention may be implemented at least in part by computer software stored on the MEM 724, which is executable by the DP 722 of the gateway 720, or by hardware, or by a combination of tangibly stored software and hardware (and tangibly stored firmware).

Similarly, at least one of the PROGs 748 in the HeNB 740 is assumed to include a set of program instructions that, when executed by the associated DP 742, enable the device to operate in accordance with the exemplary embodiments of this invention, as detailed above. In these regards the exemplary embodiments of this invention may be implemented at least in part by computer software stored on the MEM 744, which is executable by the DP 742 of the HeNB 740, or by hardware, or by a combination of tangibly stored software and hardware (and tangibly stored firmware).

Similarly, at least one of the PROGs 768 in the UE 760 is assumed to include a set of program instructions that, when executed by the associated DP 762, enable the device to operate in accordance with the exemplary embodiments of this invention, as detailed above. In these regards the exemplary embodiments of this invention may be implemented at least in part by computer software stored on the MEM 764, which is executable by the DP 762 of the UE 760, or by hardware, or by a combination of tangibly stored software and hardware (and tangibly stored firmware). Electronic devices implementing these aspects of the invention need not be the entire devices as depicted at FIG. 7 or may be one or more components of same such as the above described tangibly stored software, hardware, firmware and DP, or a system on a chip SOC or an application specific integrated circuit ASIC.

In general, the various embodiments of the UE 760 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 704, 724, 744, and 764 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 702, 722, 742, and 762 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
   at least one processor;
   memory storing a program of instructions;
   wherein the memory storing the program of instructions is configured to, with the at least one processor, cause the apparatus to at least:
   receive a preparation request from a base station to handover a user device, wherein the preparation request message comprises a physical cell identifier and a carrier frequency, wherein the physical cell identifier is used by a first home base station and at least one additional home base station, both detected on the carrier frequency by the user device;
   based on information provided by the preparation request, identify which of the home base stations using the physical cell identifier is the first home base station;
   configure a preparation request message for transmission to the first home base station, wherein the preparation request message comprises information preparing the first home base station for a user device connection handover for the user device;
   cause transmission of a preparation request message to at least one additional home base station, wherein the preparation request message comprises information usable by the at least one additional home base station to which the preparation request message is addressed to prepare the at least one additional base station for a connection re-establishment from the same user device, wherein the at least one additional home base station is prepared for the connection re-establishment using radio resource control signaling;
   receive a preparation acknowledgement message comprising information from the at least first home base station; and
   cause transmission of a preparation acknowledgement message to the base station comprising information usable by the base station to request the user device to perform a handover towards a selected home base station;
   wherein the selected home base station is one of the first home base station or the at least one additional home base station and the preparation request message and the preparation acknowledgement message are communicated via an X2 interface.

2. The apparatus of claim 1, wherein the preparation acknowledgement message further comprises information from at least one additional home base station.

3. The apparatus of claim 1, wherein the preparation acknowledgement message further comprises the aggregated information from the first home base station and at least one additional home base station.

4. The apparatus of claim 1, wherein the preparation request message sent to the at least one additional home base station does not require a response.

5. The apparatus of claim 1, wherein the apparatus is a base station gateway.

6. An apparatus comprising:
   at least one processor;
   memory storing a program of instructions;
   wherein the memory storing the program of instructions is configured to, with the at least one processor, cause the apparatus to at least:
   receive handover information comprising a physical cell identifier and carrier frequency of a home base station identified as a handover candidate;
   based on the handover information, identify a first home base station associated with the physical cell identifier and carrier frequency and a plurality of additional home base stations associated with the physical cell identifier and carrier frequency, wherein identifying the first home base station and the additional home base station comprises identifying which of the home base stations is the first home base station;
   select the first home base station as handover target;
   cause transmission of a preparation request message to the first home base station, wherein the preparation request message is addressed to prepare the first home base station for a user device connection handover;
   cause transmission of a preparation request message to at least one additional home base station, wherein the preparation request message comprises information usable by each base station to which the preparation request message is addressed to prepare the at least one additional home base station for a connection re-establishment from a same user device, wherein the at least one additional home base station is prepared for the connection re-establishment using radio resource control signaling;
   receive a preparation acknowledgement message comprising information from the home base station selected as handover target; and
   cause transmission of a handover command for the selected home base station to the above said user device using information received in the preparation acknowledgement message.

7. The apparatus of claim 6, wherein execution of the program of instructions by the processor further configures the apparatus to receive a preparation acknowledgement message comprising information from each of the at least one additional home base stations selected for connection reestablishment.

8. A method comprising:
receiving a preparation request from a base station to handover a user device, wherein the preparation request message comprises a physical cell identifier and a carrier frequency, wherein the physical cell identifier is used by a first home base station and at least one additional home base station, both detected on the carrier frequency by the user device;
based on information provided by the preparation request, identifying which of the home base stations using the physical cell identifier is the first home base station;
configuring a preparation request message for transmission to the first home base station, wherein the preparation request message comprises information preparing the first home base station for a user device connection handover for the user device;
causing transmission of a preparation request message to at least one additional home base station, wherein the preparation request message comprises information usable by the at least one additional home base station to which the preparation request message is addressed to prepare the at least one additional base station for a connection re-establishment from the same user device, wherein the at least one additional home base station is prepared for the connection re-establishment using radio resource control signaling;
receiving a preparation acknowledgement message comprising information from the at least first home base station; and
causing transmission of a preparation acknowledgement message to the base station comprising information usable by the base station to request the user device to perform a handover towards a selected home base station;
wherein the selected home base station is one of the first home base station or the at least one additional home base station and the preparation request message and the preparation acknowledgement message are communicated via an X2 interface.

9. The method of claim 8, wherein the preparation acknowledgement message further comprises information from at least one additional home base station.

10. The method of claim 8, wherein the preparation acknowledgement message further comprises the aggregated information from the first home base station and at least one additional home base station.

11. The method of claim 8, wherein the preparation request message sent to the at least one additional home base station does not require a response.

12. The method of claim 8, wherein the apparatus is a base station gateway.

* * * * *